(12) United States Patent
Mears et al.

(10) Patent No.: US 7,156,033 B2
(45) Date of Patent: Jan. 2, 2007

(54) INFLATING AIRCRAFT FLOTATION DEVICE

(75) Inventors: Tony W. Mears, Longmont, CO (US); David G. Walder, Boulder, CO (US); Thomas Edward Berg, Ft. Collins, CO (US)

(73) Assignee: FloatLogic, Inc., Boulder, CO (US)

( * ) Notice: Subject to any disclaimer, the term of this patent is extended or adjusted under 35 U.S.C. 154(b) by 0 days.

(21) Appl. No.: 10/789,407

(22) Filed: Feb. 27, 2004

(65) Prior Publication Data
US 2004/0226498 A1    Nov. 18, 2004

Related U.S. Application Data

(63) Continuation-in-part of application No. 10/223,665, filed on Aug. 19, 2002.

(51) Int. Cl.
B63B 43/10    (2006.01)

(52) U.S. Cl. .................. 114/68; 114/123; 244/101; 244/107

(58) Field of Classification Search .................. 114/68, 114/69, 360, 123; 244/101, 105, 139, 106, 244/107
See application file for complete search history.

(56) References Cited

U.S. PATENT DOCUMENTS

| | | | |
|---|---|---|---|
| 151,400 A | 5/1874 | Keeler et al. ............... 114/348 |
| 980,790 A | 1/1911 | Johnson ....................... 114/360 |
| 1,038,928 A | 9/1912 | Menzel ........................ 114/360 |
| 1,133,629 A | 3/1915 | Foster ........................ 114/68 |
| 1,220,876 A | 3/1917 | Moore ......................... 114/360 |
| 1,249,633 A | 12/1917 | Jelercic ....................... 114/360 |
| 1,622,508 A | 3/1927 | Harper ........................ 114/360 |
| D154,774 S | 8/1949 | Harris et al. ................ D12/300 |
| 2,508,304 A | 5/1950 | Sturtevant ................... 114/345 |
| 2,914,779 A | 12/1959 | Walker ........................ 441/39 |
| 2,924,192 A | 2/1960 | Salvage ....................... 114/68 |
| 3,092,853 A | 6/1963 | Owen .......................... 114/69 |
| 3,273,832 A * | 9/1966 | Keedy ......................... 244/105 |
| 3,506,222 A * | 4/1970 | Anderson ..................... 244/101 |
| 3,822,662 A | 7/1974 | Morita et al. ................ 114/123 |
| 4,298,177 A * | 11/1981 | Berlongieri .................. 244/139 |
| 4,389,961 A | 6/1983 | Parish ......................... 114/345 |
| 4,458,618 A | 7/1984 | Tuffier ........................ 114/68 |
| 4,495,880 A | 1/1985 | Maniscalco et al. ......... 114/123 |
| 4,517,914 A | 5/1985 | Geracitano ................... 114/345 |
| 4,545,319 A | 10/1985 | Ferronniere et al. ........ 114/345 |
| 4,655,415 A * | 4/1987 | Miller et al. ................. 244/105 |
| 4,667,618 A | 5/1987 | Cigognetti ................... 114/345 |
| 4,678,443 A | 7/1987 | Edwards et al. .............. 441/38 |
| 4,723,929 A | 2/1988 | Parish ......................... 441/39 |
| 4,817,555 A | 4/1989 | Meinen ....................... 114/360 |
| 4,864,961 A | 9/1989 | Slonski ....................... 114/360 |
| 4,867,094 A | 9/1989 | Binks .......................... 114/359 |
| 4,996,936 A | 3/1991 | Brundritt ..................... 114/68 |
| 5,102,070 A * | 4/1992 | Smialowicz et al. ......... 244/107 |
| 5,150,662 A | 9/1992 | Boyd et al. ................... 114/68 |

(Continued)

FOREIGN PATENT DOCUMENTS

DE    3530618 A1    12/1987

Primary Examiner—Lars A. Olson
(74) Attorney, Agent, or Firm—Emery L. Tracy (57) ABSTRACT

A flotation device for maintaining an aircraft in a floating and stable condition is provided. The flotation device comprises at least one flotation bladder mounted to the aircraft and an inflation mechanism for inflating the flotation bladder. A method for maintaining an aircraft in a floating condition is also provided.

26 Claims, 9 Drawing Sheets

U.S. PATENT DOCUMENTS

| | | | |
|---|---|---|---|
| 5,215,031 A | 6/1993 | Inman et al. | 114/360 |
| 5,357,888 A | 10/1994 | Insinna | 114/69 |
| 5,743,786 A | 4/1998 | Lindsey | 446/85 |
| 5,765,778 A * | 6/1998 | Otsuka | 244/101 |
| 5,906,530 A | 5/1999 | Lindsey | 446/85 |
| 6,070,546 A | 6/2000 | Downey et al. | 114/123 |
| 6,431,108 B1 | 8/2002 | Lopez-Perea Lloveres | 114/360 |
| 6,435,125 B1 | 8/2002 | Mears | 114/360 |
| 6,470,818 B1 | 10/2002 | Mears et al. | 114/68 |
| 6,484,656 B1 | 11/2002 | Mears et al. | 114/68 |

* cited by examiner

INFLATING AIRCRAFT FLOTATION DEVICE

The present application is a continuation-in-part and claims priority of pending patent application Ser. No. 10/223,665, filed Aug. 19, 2002, entitled "Inflating Watercraft Flotation Device".

BACKGROUND OF THE INVENTION

1. Field of the Invention

The present invention relates to flotation devices for aircraft and, more particularly, it relates to a compact inflating flotation device that would inhibit the aircraft from sinking in case of water landing. The flotation device is inflatable, either manually or automatically, when sensors or monitoring systems determines the aircraft is sinking or is at risk.

2. Description of the Prior Art

Aircraft and aircraft travel is both a popular pastime and a vital commercial activity in much of the world today. An aircraft is often a substantial investment for the owner and/or operator. In the case of commercial airlines, the aircraft is often the livelihood of the owner of the aircraft. As a general concept, when a water landing is required for an aircraft which is not designed for regular water landings, aircrafts usually sink when the fuselage of the aircraft takes on water and the aircraft loses its buoyancy. If the aircraft sinks, especially if it happens quickly, a serious condition exists in that loss of life and loss of property often occurs.

The flotation device of the present invention solves many of these problems and others by being easy to install, either as a retrofit to an existing aircraft or during manufacture of the aircraft. In addition, the flotation device of the present invention is designed to deploy manually or automatically when sensors or monitoring systems determine the aircraft is sinking or is at risk, such as a pre-determined level of water is present in the fuselage of the aircraft. Once deployed the present invention will keep the aircraft afloat prior to complete flooding of the aircraft.

The primary aspect of the present invention is to provide a deployable flotation device to keep the aircraft floating and stable after a water landing, especially when water has partially filled the fuselage of the aircraft.

Another aspect of the present invention is to provide a flotation device that does not interfere with the aesthetics and/or operation of the aircraft when not deployed, especially the aerodynamics, weight, balance, and emergency egress.

Another aspect of the present invention is to provide for a flotation device that can be easily monitored, inspected, maintained, and removed and a new one re-installed as may be required.

Another aspect of the present invention is to provide a device that is easy to manufacture and install.

Another aspect of the present invention is to provide additional cushioning to the outside of the aircraft.

SUMMARY

The present invention is a flotation device for maintaining an aircraft in a floating and stable condition. The flotation device comprises at least one flotation bladder mounted to the aircraft and inflation means for inflating the flotation bladder manually as determined by the pilot or automatically when sensors or monitoring systems determine the aircraft is sinking or is at risk, such as a predetermined amount of water entering the aircraft or other indication of emergency water landing.

In addition, the present invention is an emergency buoyant support for an aircraft in the water. The emergency buoyant support comprises a cover releasably secured to the aircraft. At least one inflatable flotation bladder is positioned between the cover and the aircraft wherein upon inflation of the flotation bladder, the flotation bladder moves the cover in a general direction away from the aircraft.

The present invention further includes a method for maintaining an aircraft in the water in a stable floating condition. The method comprises mounting at least one flotation bladder to the aircraft, and inflating the flotation bladder upon a predetermined event.

Other aspects of this invention will appear from the following description and appended claims, reference being made to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE PREFERRED EMBODIMENTS

As discussed above, the present application is a continuation-in-part of pending patent application Ser. No. 10/223,665, filed Aug. 19, 2002, entitled "Inflating Watercraft Flotation Device", assigned to the same assignee of the present invention and is hereby herein incorporated by reference.

As illustrated in FIGS. 1–9, the present invention is an inflating aircraft flotation device, indicated generally at 10, mounted to an aircraft 12 and which activates, either manually or automatically, to maintain the aircraft 12 in a floating condition during the occurrence of a predetermined event such as a water landing and water entering the aircraft 12. The aircraft 12 can be any type of aircraft including, but not limited to, private airplanes, commercial airplanes, military airplanes, private jets, commercial jets, military jets, etc, of various types, including single or multiple engines.

The flotation device 10 is preferably mounted on the exterior fuselage 16 of the aircraft 12, or imbedded into the aircraft during construction of the aircraft. Preferably, the flotation device 10 has a low profile and an unobtrusive visual presence, so that the flotation device 10 does not significantly affect either the aerodynamic or visual lines of the aircraft 12 when not inflated, as described in further detail below.

The flotation device 10 is mounted directly on the fuselage 16 of the aircraft 12. In alternative embodiments, the fuselage of the aircraft 12 can be molded to receive the flotation device 10 of the present invention, or the flotation device 10 is imbedded into and is a part of the aircraft itself. In this embodiment, the flotation device 10 is receivable within the molded fuselage without the need for a mounting plate (as will be described as further below). Or, in still a further alternative embodiment, the fuselage 16 can have a longitudinal recess (not shown) molded therein and a mounting plate 14 can be co-molded as an extrusion. The mounting plate 14 is inserted and secured within the longitudinal recess of the fuselage 16 after the aircraft 12 is constructed. Any means including, but not limited to, adhesive, screws, rivets, bolts, etc can accomplish securement of the mounting plate 14 within the longitudinal recess of the fuselage 16. The mounting of the mounting plate 14 within the longitudinal recess reduces the outward extent of the flotation device 10 from the outside of the aircraft 12. In fact, depending on the depth of the recess, the extent of the flotation device 10 can be even with or below the outer side of the fuselage 16 of the aircraft 12.

The mounting plate 14 of each embodiment is preferably constructed from a semi-rigid material, such as UHMW plastic. The mounting plate 14 is preferably constructed from plastic, resin, metal, such as aluminum, or similar material although constructing the mounting plate 14 from different types of material is within the scope of the present invention. The material must be flexible enough to allow the mounting plate 14 to bend to match the curve of the fuselage 16 and to allow compression and bending under pressure. However, the material of the mounting plate 14 must to be rigid enough so that the inflation of the flotation bladder 28 will not dislodge the flotation bladder 28 from the mounting plate 14.

Preferably, the mounting plate 14 is mounted to the exterior of the fuselage 16 or within the recess using either an adhesive, metal bolts, rivets, or screws (not shown). The preferred type of adhesive is a two-part epoxy. The preferred brand of epoxy is DP 190 or 460, manufactured by Minnesota Mining and Manufacturing (3M), St. Paul, Minn. Screws (not shown) may be necessary on certain aircraft since some adhesive only sticks to the outermost layer of paint or other finish on the exterior of the fuselage 16.

As illustrated in FIGS. 7–13, the flotation device 10 of the present embodiment of the invention further includes a cover 22, a cover-removing tubing 24, and a main flotation bladder 28. The mounting plate 14 has two channels 30, 32 spaced apart from each other and extending longitudinally along the length of the mounting plate 14. The mounting plate 14 can be extruded or otherwise constructed in a single piece or can be constructed in two separate pieces to allow accommodation of various-sized flotation bladders 28. The two separate pieces of the mounting plate 14 can be moved apart or together during mounting of the mounting plate 14 to accommodate the various flotation bladder 28 sizes.

Figure 9:
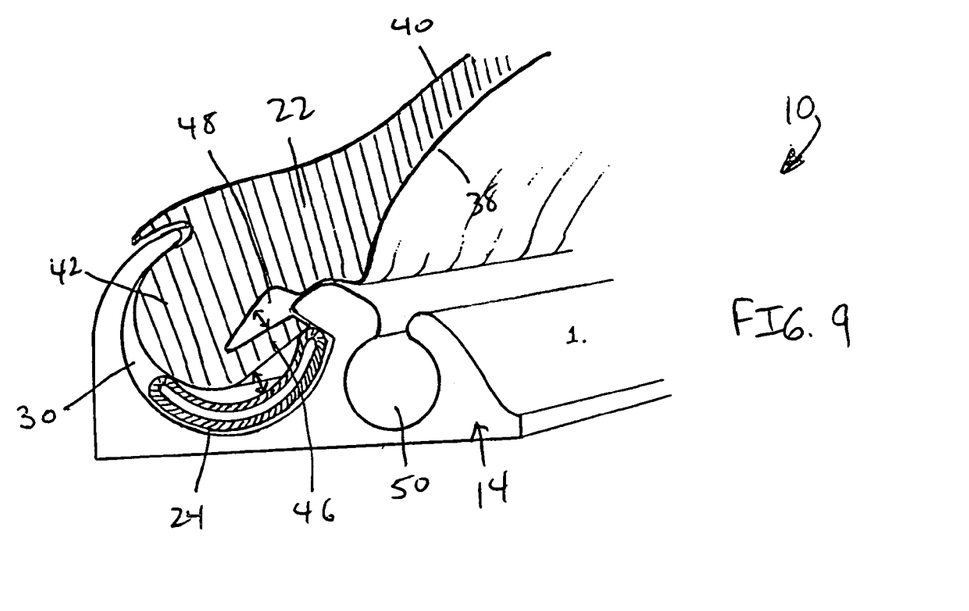
FIG. 9 is a sectional view illustrating the flotation device with a cover-removing tubing in the non-inflated condition.
Figure 10:
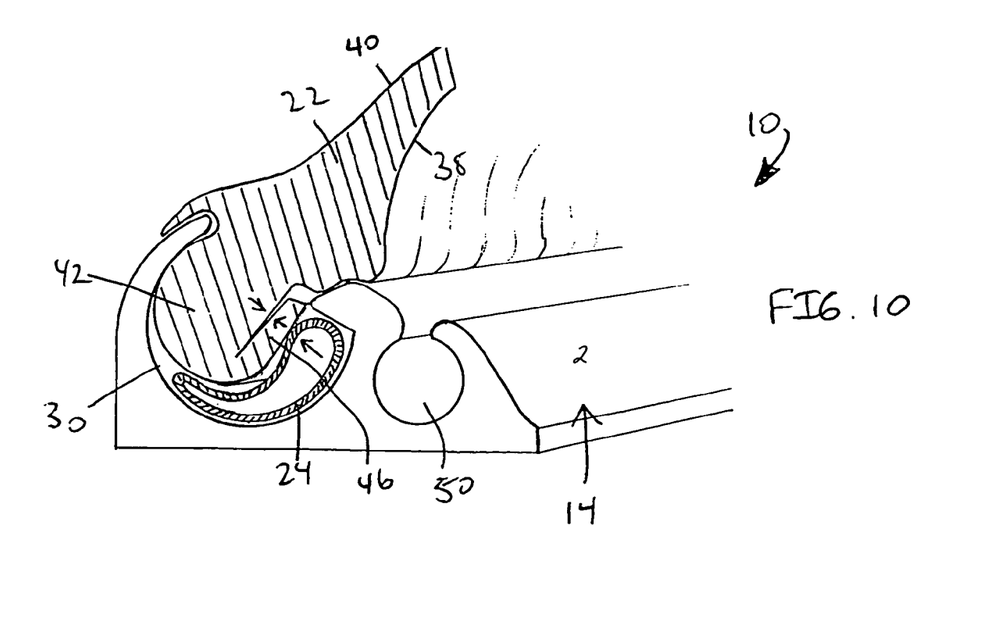
FIG. 10 is a sectional view illustrating the flotation device beginning the inflation process of the cover-removing tubing from the non-inflated condition.
Figure 11:
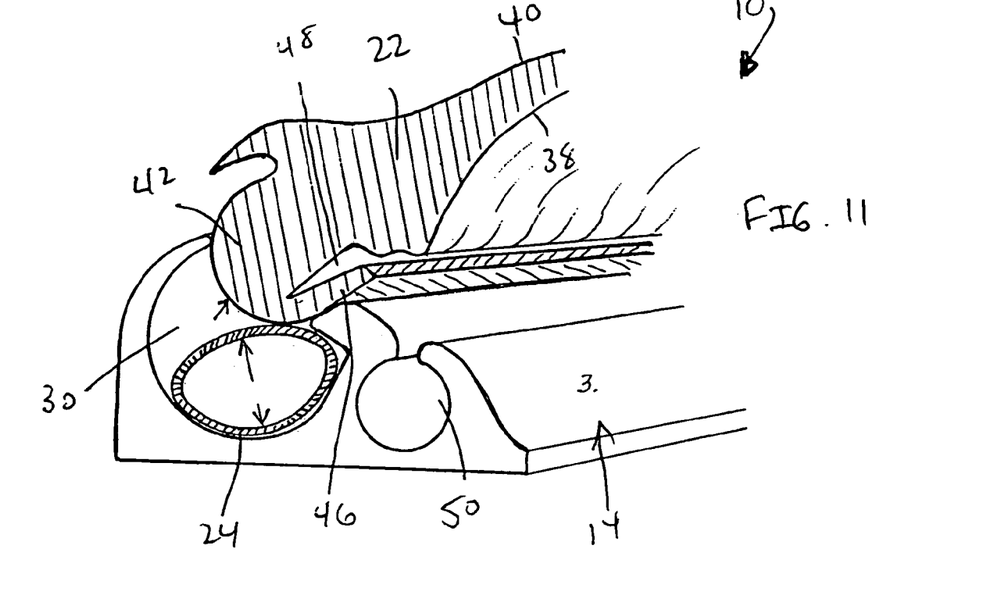
FIG. 11 is a sectional view illustrating the flotation device continuing the inflation process of the cover-removing tubing.
Figure 12:
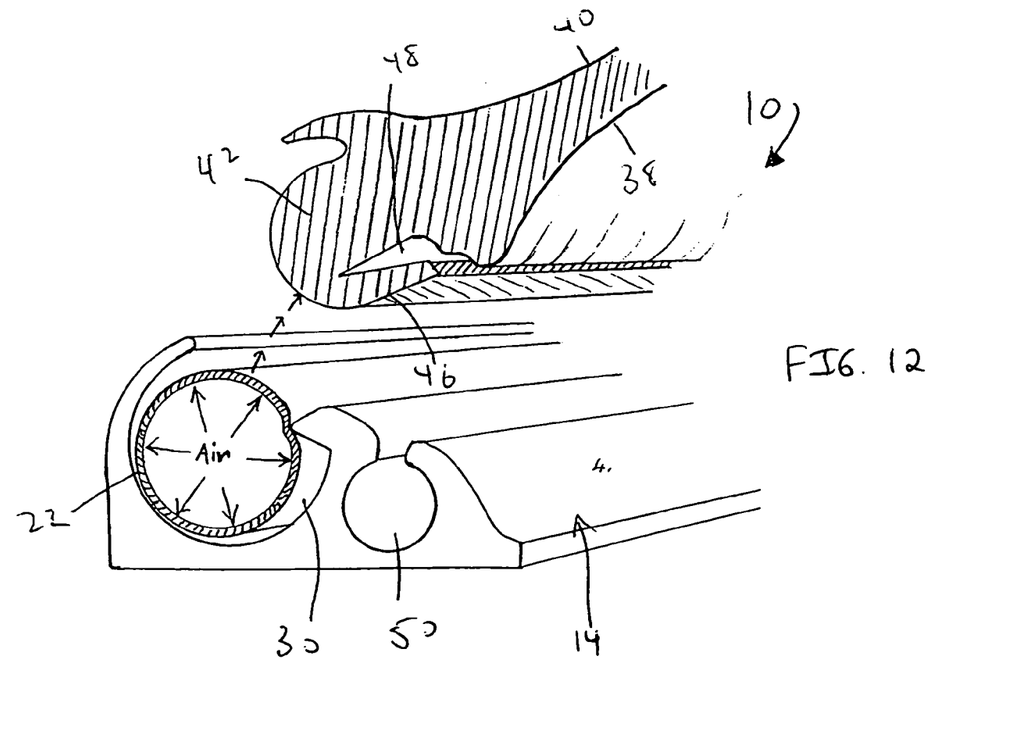
FIG. 12 is a sectional view illustrating the flotation device having the cover-removing tubing inflated to the inflated condition to remove the cover.
Figure 13:
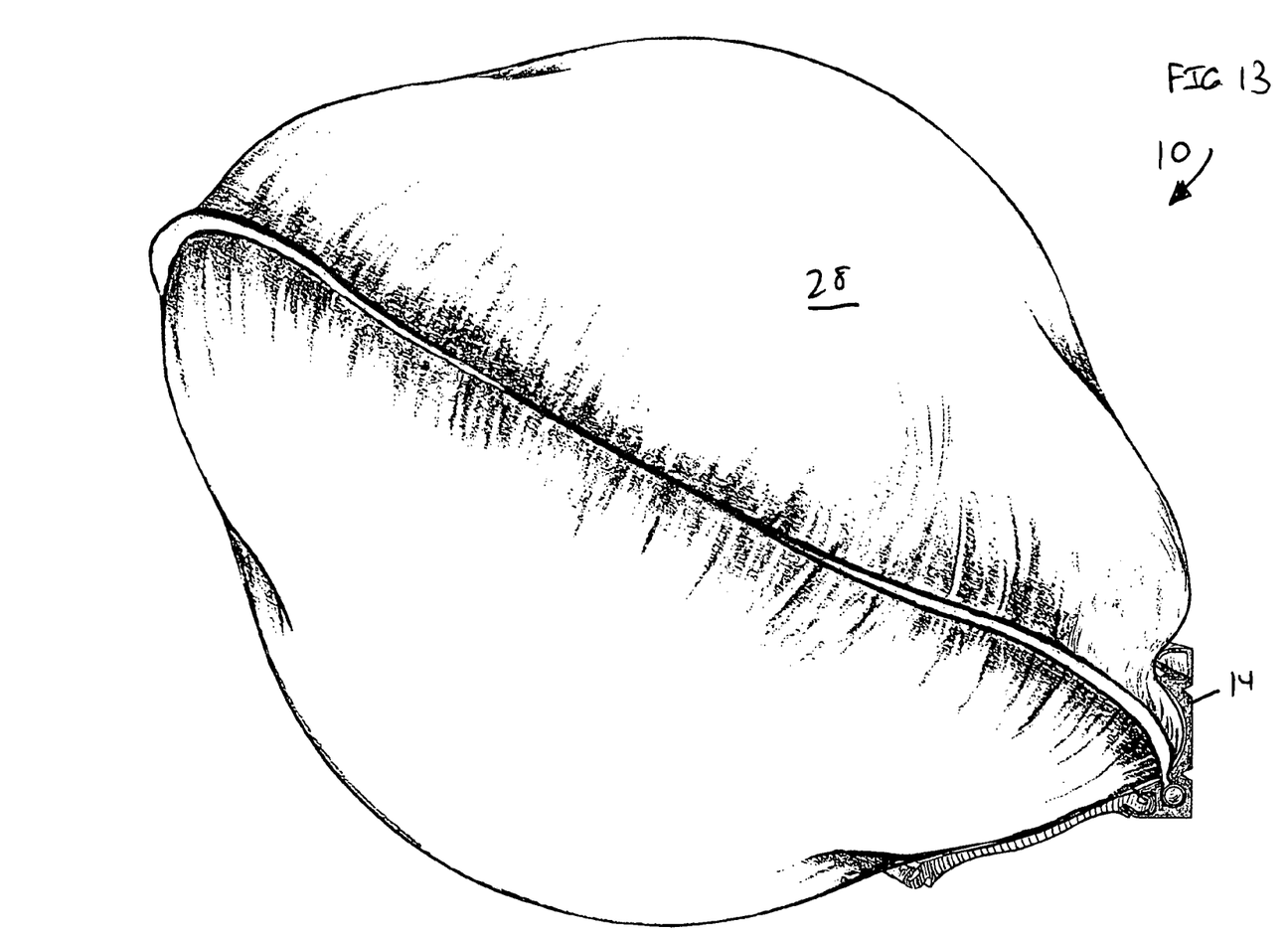
FIG. 13 is a perspective view illustrating the inflating aircraft flotation device of FIG. 1, constructed in accordance with the present invention, with the flotation bladders being in the inflated condition.

The flexible cover-removing tubing 24 is positioned in at least one of the channels 30, 32 of the mounting plate 14. In the preferred embodiment, the cover-removing tubing 24 is constructed from a flexible material so that the cover-removing tubing 24 can be collapsed against itself. However, covers made of other material, and other removal methods including, but not limited to, mechanical, spring loaded cover release mechanism, destructive perforation by small bladder or cord, chemical, or explosive such as explosive bolts, etc., and rigid or semi-rigid covers including, but not limited to, aluminum, composites, etc., are within the scope of the present invention. When the cover-removing tubing 24 is expanded it substantially fills the channels 30 and/or 32, as illustrated in FIGS. 9–11. Operation of the cover-removing tubing 24 and the process of inflating the remainder of the flotation device 10 will be described in further detail below.

In the alternative, the cover 22 can be connected directly and fastened to the aircraft 12 so that the cover 22, upon deployment is perforated at prescored locations, or the flotation bladders 28 are released through a method that breaks or otherwise destroys the cover 22. With this embodiment, channels are not required.

Figure 1:
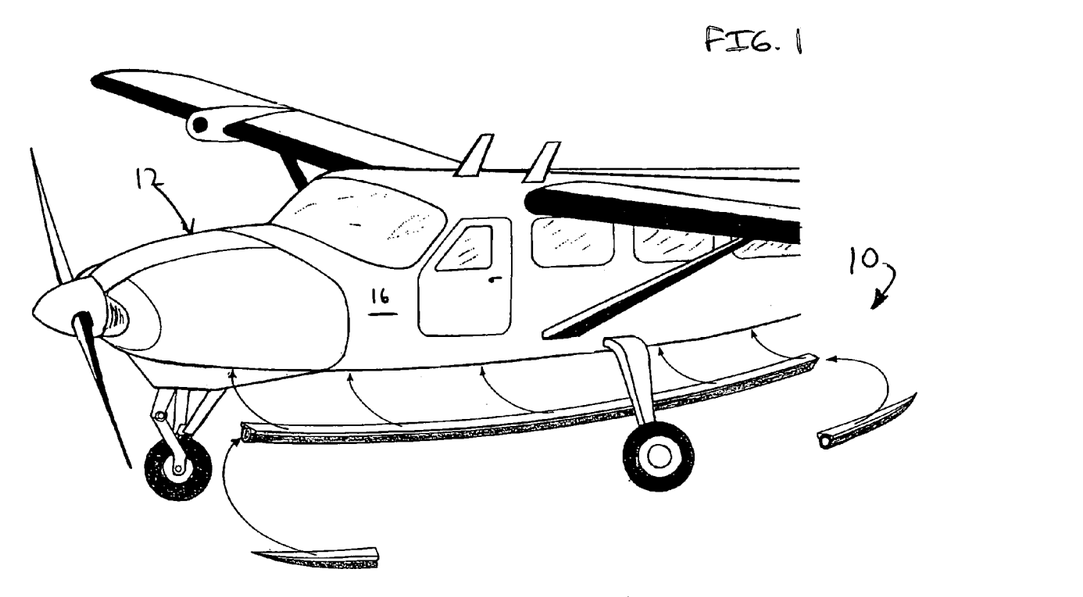
FIG. 1 is a perspective view illustrating an inflating aircraft flotation device, constructed in accordance with the present invention, prior to mounting of the flotation device on the aircraft.
Figure 2:
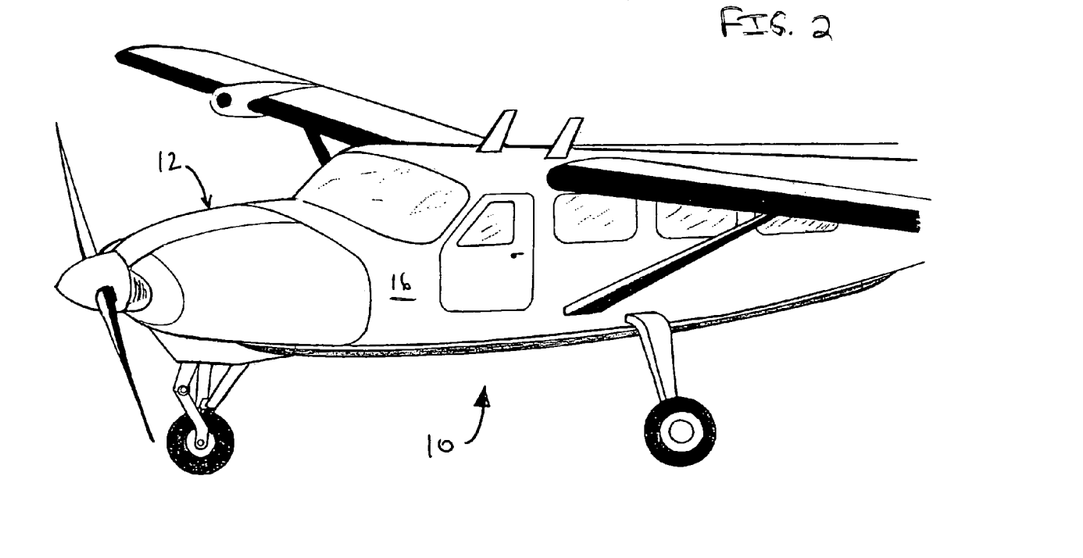
FIG. 2 is a perspective view illustrating the inflating aircraft flotation device of FIG. 1, constructed in accordance with the present invention, with the flotation device mounted on the aircraft.
Figure 3:
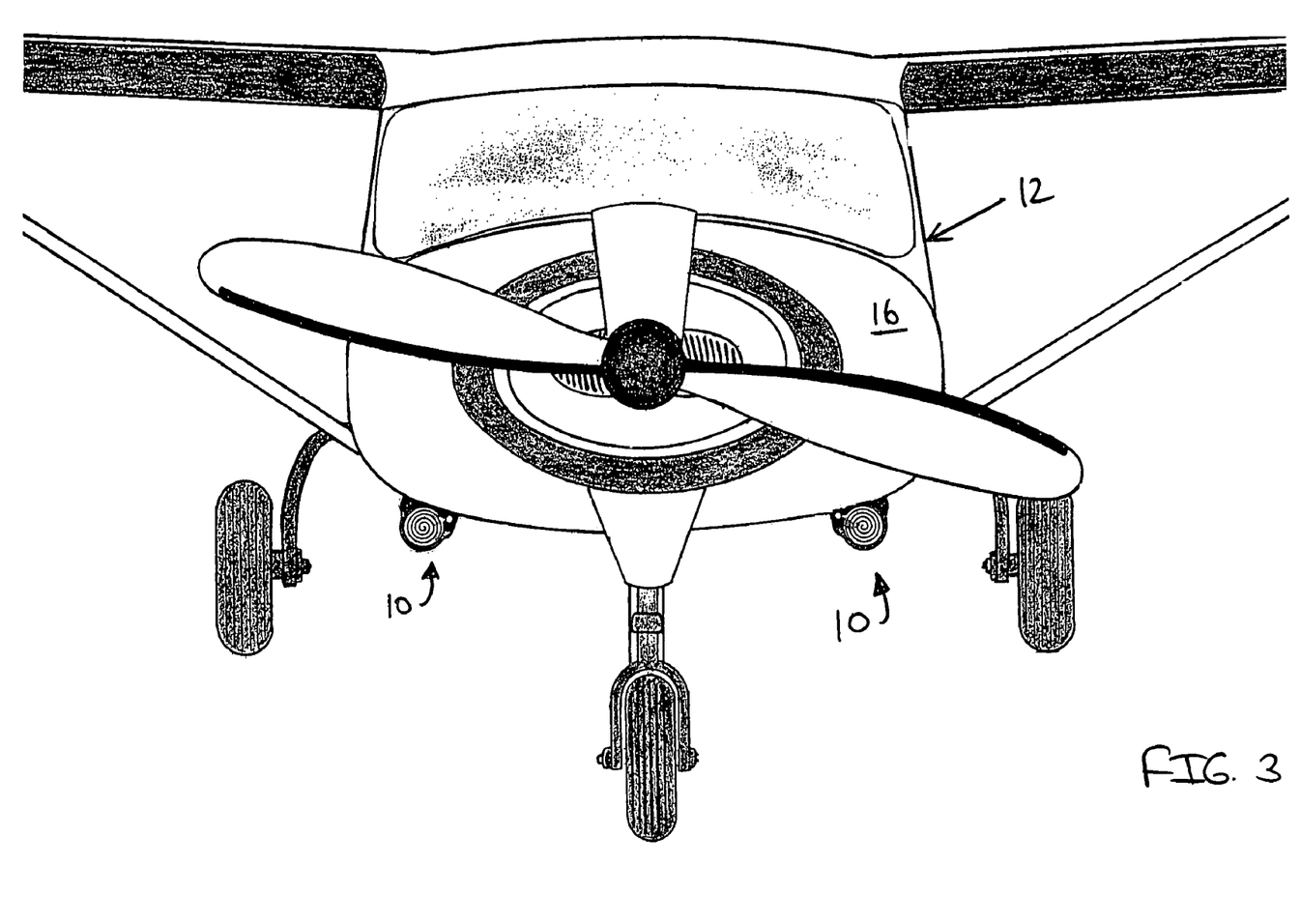
FIG. 3 is an elevational front view illustrating the inflating aircraft flotation device of FIG. 1, constructed in accordance with the present invention, with the flotation device mounted on the aircraft.
Figure 4:
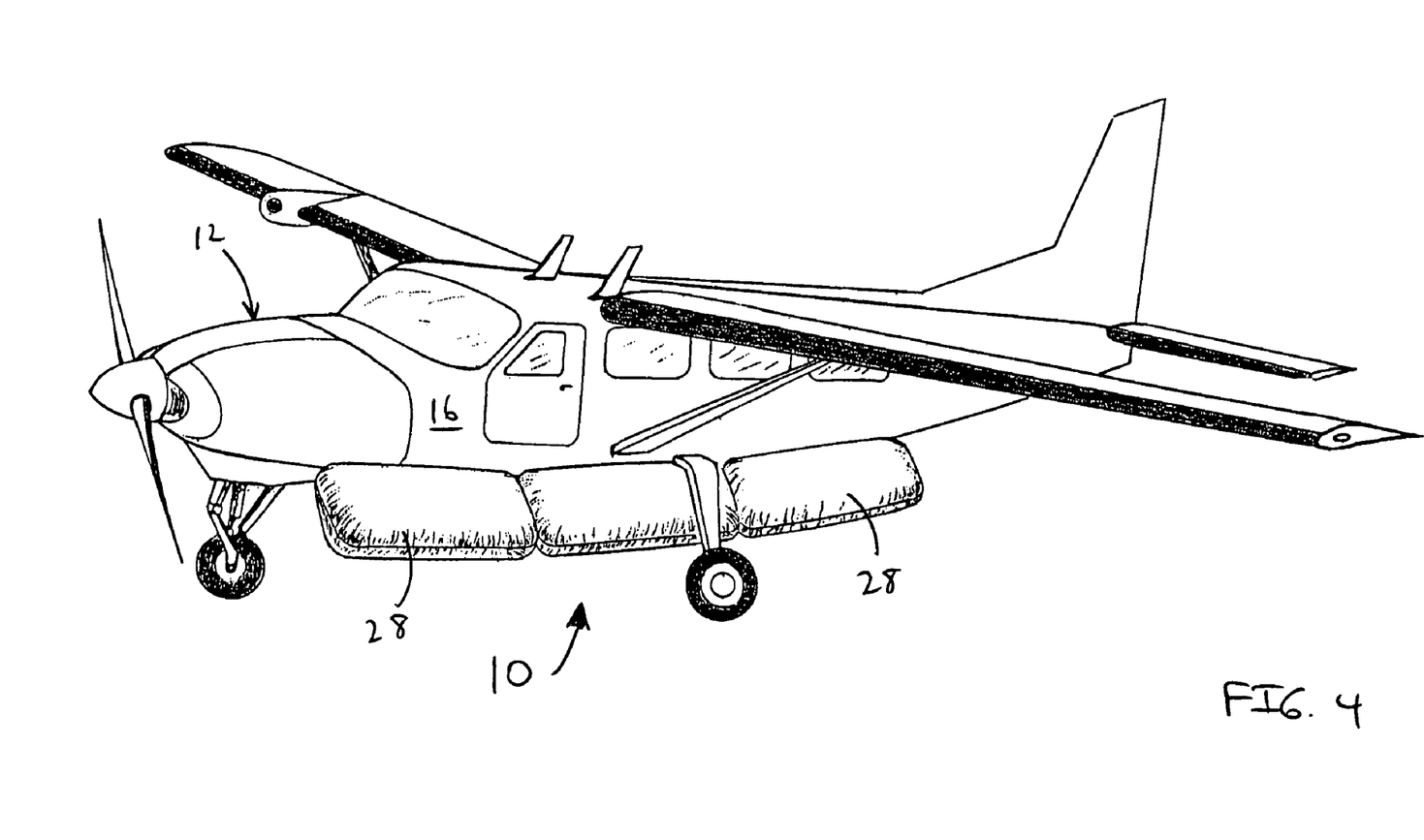
FIG. 4 is a perspective view illustrating the inflating aircraft flotation device of FIG. 1, constructed in accordance with the present invention, with the flotation bladders being in an inflated condition.
Figure 5:
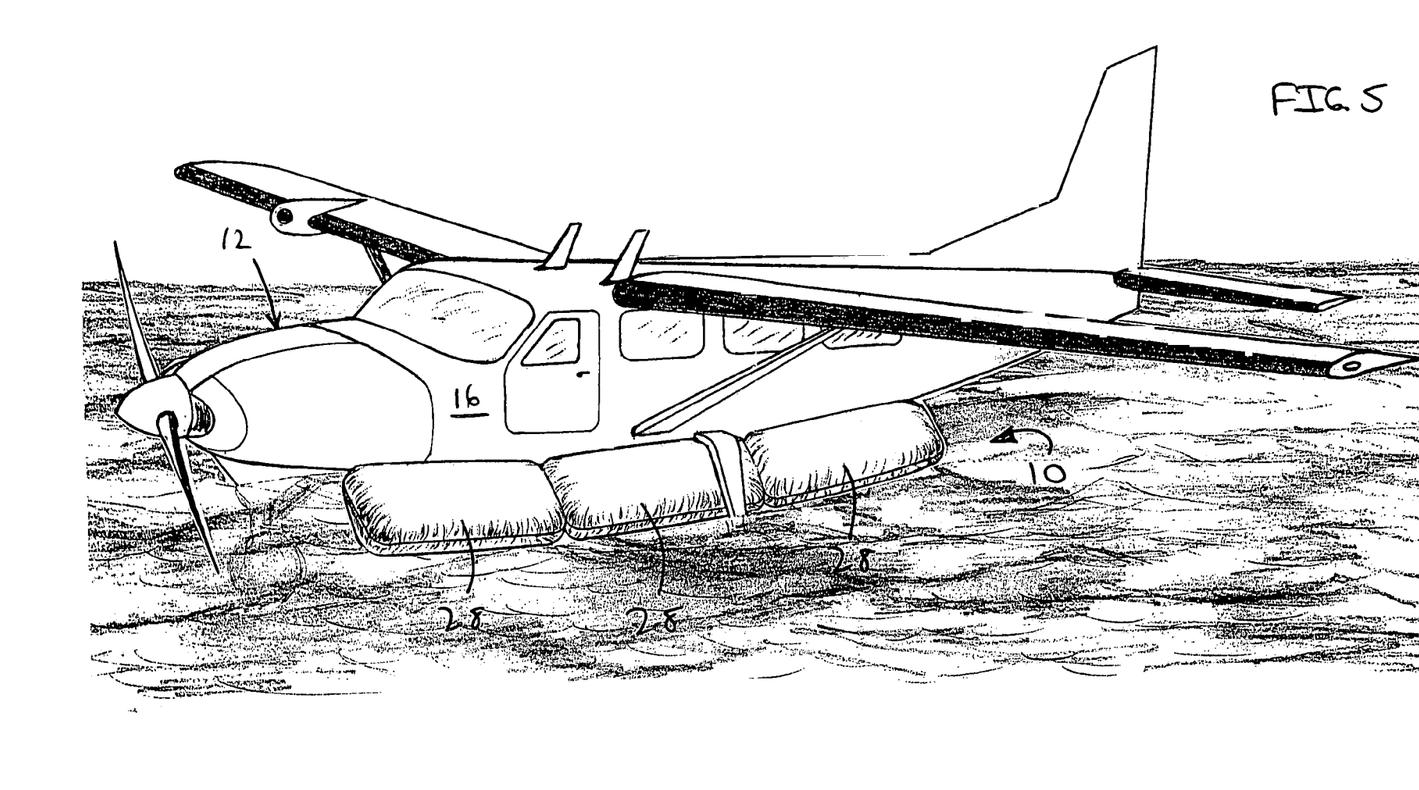
FIG. 5 is a perspective view illustrating the inflating aircraft flotation device of FIG. 1, constructed in accordance with the present invention, with the aircraft being positioned in the water and the flotation bladders being in the inflated condition.
Figure 6:
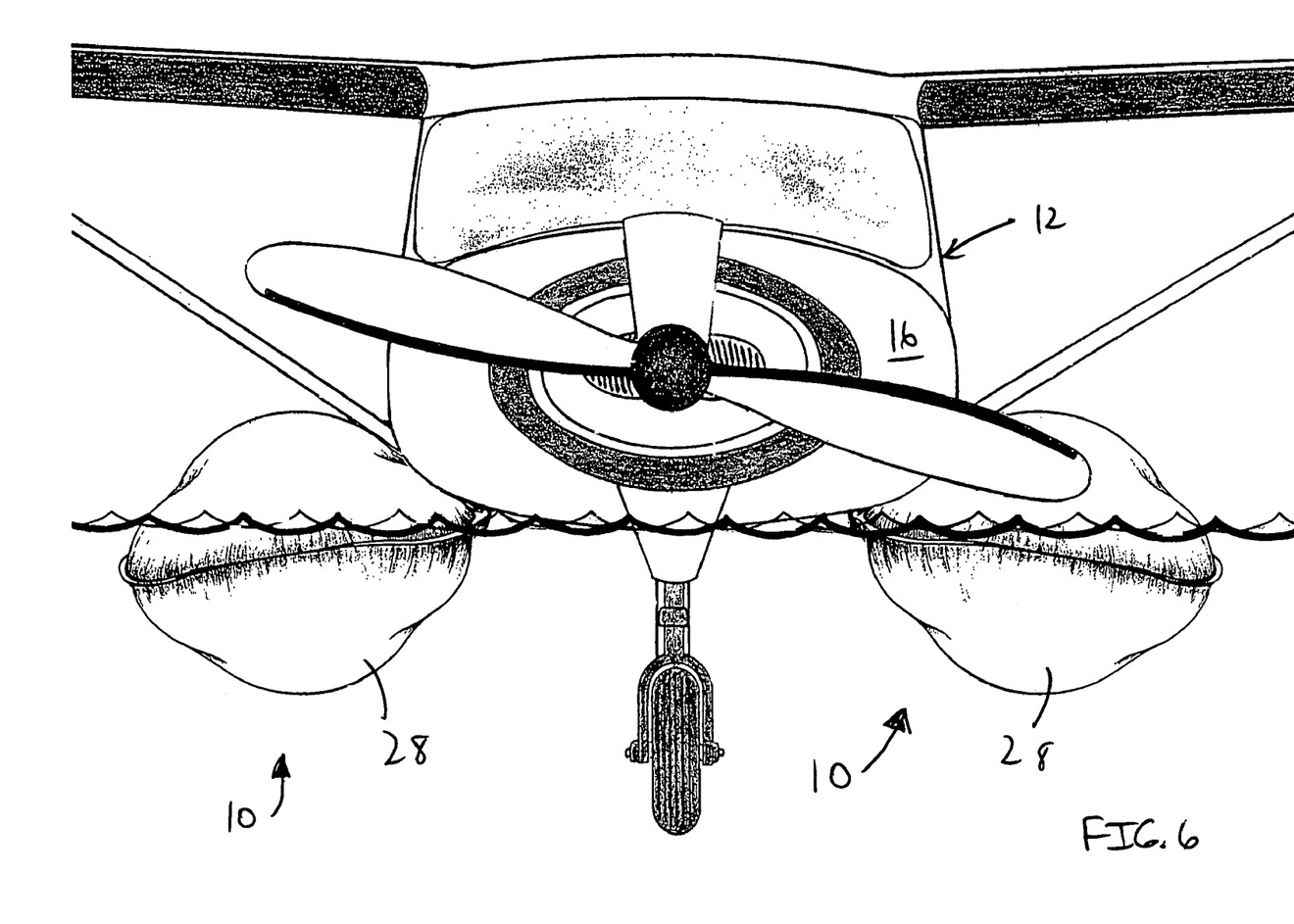
FIG. 6 is an elevational front view illustrating the inflating aircraft flotation device of FIG. 1, constructed in accordance with the present invention, with the aircraft being positioned in the water and the flotation bladders being in the inflated condition.
Figure 7:
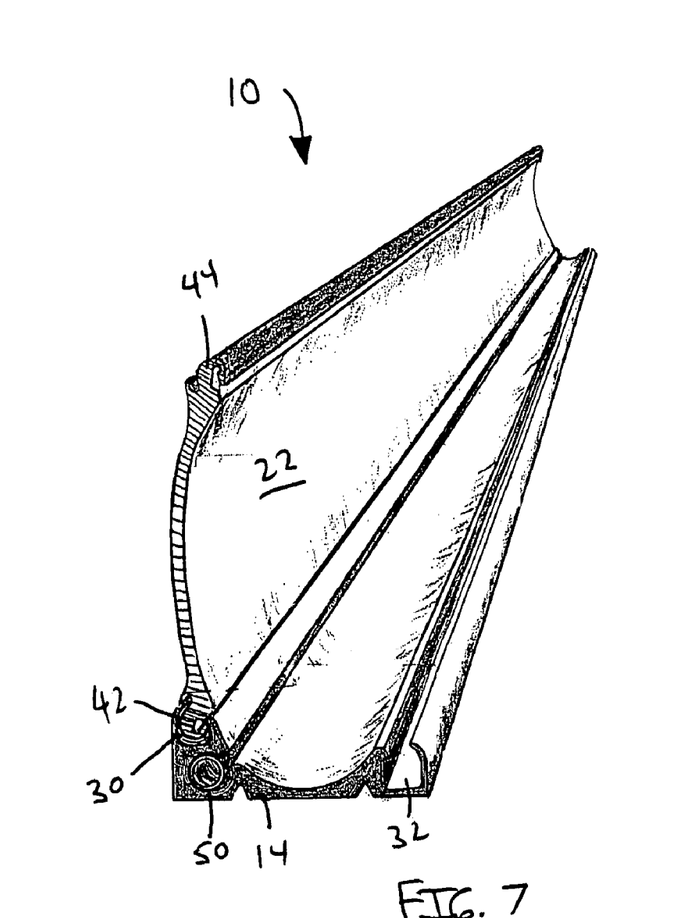
FIG. 7 is a perspective view illustrating the inflating aircraft flotation device of FIG. 1, constructed in accordance with the present invention, without the cover removing tubing and the flotation bladders.
Figure 8:
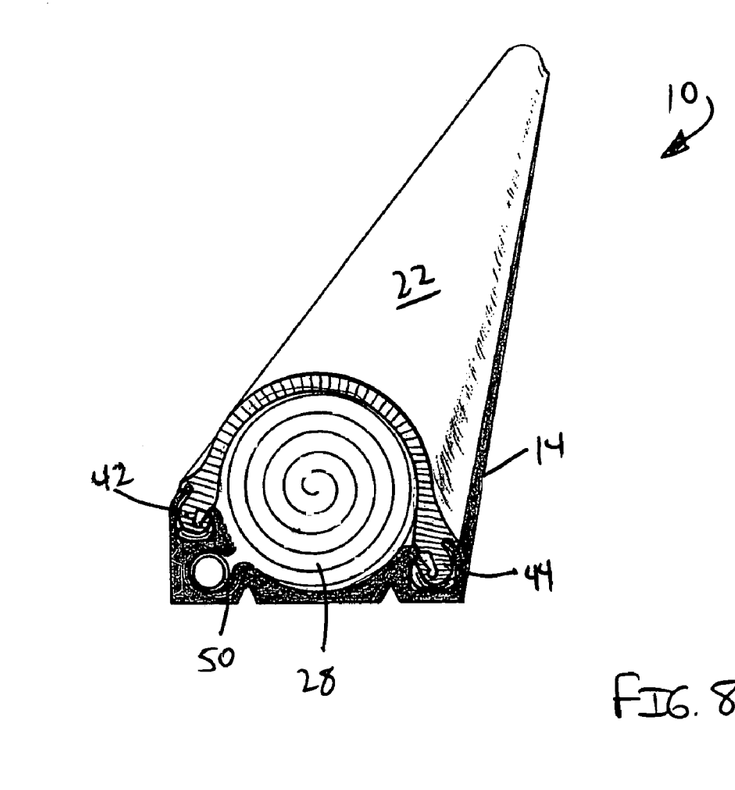
FIG. 8 is a perspective view illustrating the inflating aircraft flotation device of FIG. 1, constructed in accordance with the present invention, prior to inflating.

Referring back to FIG. 7, the cover 22 has an interior surface 38, an exterior surface 40, a first cover edge 42, and a second cover edge 44 with the first cover edge 42 and the second cover edge 44 extending longitudinally along the length of the cover 22. As illustrated in FIG. 8, the first and second cover edges 42, 44 are shaped to fit in the channels 30, 32, respectively, on the mounting plate 14. The cover 22 can be attached to the mounting plate 14 by sliding the first and second cover edges 42, 44 into the channels 30, 32, respectively.

In the alternative, the cover 22 can be snapped into the channels 30, 32 of the mounting plate 14. In this instance, as illustrated in FIGS. 9–12, the first and second cover edges 42, 44 of the cover 22 have a movable finger 46 provided along each side of the cover 22. A space 48 between the fingers 46 and the first and second cover edges 42, 44 of the cover 22 allow the finger 46 to move into the space 48 toward the first and second cover edges 42, 44 and be inserted into the channels 30, 32 and to maintain the first and second cover edges 42, 44 within the channels 30, 32.

The cover 22 of the flotation device 10 of the present invention is preferably constructed from a flexible, durable material, such as thermoplastic rubber, as it is continuously exposed to the elements. As illustrated in FIG. 7, preferably, the cover 22 is initially formed in a substantially flat position thereby allowing the cover 22 to spring back to the substantially flat position upon release from the mounting plate 14. Furthermore, a puncture resistant material (not shown) can be molded within the cover 22 to inhibit objects from piercing the cover 22 and damaging the flotation bladders 28 thereunder. Actual operation of the cover 22 being removed from the mounting plate 14 will be described in further detail below.

As illustrated in FIGS. 7 and 8, the flotation device 10 includes a bladder-retaining slot 50 extending along the mounting plate 14 between the first channel 30 and the second channel 32. The bladder-retaining slot 50 has a narrowed neck at the top of the bladder-retaining slot 50. The bladder-retaining slot 50 can be any diameter for retaining any size bladder 26 required for maintaining the aircraft 12 in a floating condition.

As illustrated in FIG. 8, the flotation bladder 28 of the flotation device 10 of the present invention is folded into a substantially spiral configuration to fit between the mounting plate 14 and the cover 22. The flotation bladder 28 can be configured in a round spiral wound or a flat spiral wound. Winding the flotation bladder 28 in a flat spiral wound allows the mounted flotation device 10 to have a lower profile on the fuselage of the aircraft 12. Other packing methods of the flotation bladder 28 including, but not limited to, folding, etc., are within the scope of the present invention.

Preferably, the flotation bladder 28 is constructed from urethane coated ballistic nylon having the edges lap welded to maintain the integrity of the flotation bladder 28. It should be noted, however, that it is within the scope of the present invention to construct the flotation bladder 28 from different types of materials and to seal the material with various types of welds, etc. The flotation bladder 28 should be lightweight yet sufficiently strong to retain its integrity, even when inflated, against broken aircraft parts, after an emergency water landing.

The flotation bladder 28 is preferably constructed from a durable, puncture resistant, lightweight, coated fabric or plastic film, Mylar, ballistic coated nylon, or other material that can be compacted and is relatively lightweight and usable for inflatable flotation bladders. Preferably, the flotation bladders 28 have an elongated configuration and attached along the length of both sides of the aircraft 12 such that the majority of the buoyant forces are lower on the aircraft 12 and the aircraft 12 floats higher in the water and do not obstruct doors and/or windows as possible egress locations. The elongated configuration of the flotation bladders 28 offers less wind and/or water resistance when positioned along the length of the aircraft 12. An elongated flotation bladder 28 with elongated attachment provides less stress at the mounting location to the aircraft 12 as compared to a single point mounting. More focused, direct flotation points are present if flotation bladder 28 profile is kept close to aircraft 12 rather than farther apart as with spherical bladders. Furthermore, elongated flotation bladders 28 provide more focused directed cushioning if used as cushioning of outside of aircraft 12.

Furthermore, the flotation bladders 28 could also be positioned on the wings of the aircraft 12. The closer the flotation bladders 28 are positioned to the tips of the wings, the more additional stability is provided.

In a preferred embodiment, the flotation bladder 28 has a tongue portion (not shown). The tongue portion extends from the flotation bladder 28 and connects to the gas supply. The tongue portion allows the flotation bladder 28 to be spirally wound in a tight manner without interference between a valve (not shown) and the wound flotation bladder 28.

Preferably, the valve is welded within the flotation bladder 28. Each valve has varying sized orifices (not shown) to control the flow of gas to the flotation bladders 28 and allow inflation of the flotation bladders 28 to be timed subsequent to inflation of the cover-removing tubing 24. The valve of the flotation device 10 of the present invention can be a check valve. As a check valve, only one-way airflow into the flotation bladders 28 is allowed thereby maintaining the flotation bladders 28 in an inflated condition upon cessation of the airflow thereto.

As illustrated in FIG. 7, to maintain the flotation bladder 28 within the bladder-retaining slot 50, the flotation bladder 28 is lap welded about a gas supply line 58. The first supply line 58 is connected to a gas supply (not shown) and receivable within the bladder retaining slot 50 to maintain the flotation bladder 28 to the mounting plate 14. The gas supply line 58 also serves as a source for filling the cover-removing tubing 24 and the flotation bladder 28 during activation of the flotation device 10.

In another embodiment of the flotation device 10 of the present invention, the gas supply line 58 can have a plurality of apertures (not shown). The flotation bladder 28 is welded about the gas supply line 58 such that the gas through the gas supply line 58 can flow into the flotation bladder 28. Check valves (not shown) can be provided within the gas supply line 58 or elsewhere to prevent gas from flowing out of the flotation bladders 28 upon cessation of the gas flow.

The cover-removing tubing 24 preferably has rigid ends (not shown) for attaching to a gas supply and connecting the cover-removing tubing 24 together. To remove the cover 22 so that the flotation bladder 28 can be inflated, inert, compressed gas such as oxygen, $CO_2$, nitrogen, or some combination thereof, is released from the gas supply and flows through the gas supply line 58 to inflate the cover-removing tubing 24. The gas can be also be generated by a gas generator, compressor, automatic pump, manual pump, or other means.

As illustrated in FIGS. 9–12, the cover-removing tubing 24 expands and urges the finger 46 into the space 48 in a direction generally toward the first cover edge 42 of the cover 22. As the cover-removing tubing 24 inflates, the moved finger 46 clears the first channel 30. Since the cover-removing tubing 24 and the flotation bladder 28 are connected to the same gas supply line, at the same time, the flotation bladder 28 is inflating thereby urging the cover 22 in a direction generally away from the mounting plate 14 and removing one side of the cover 22 from the mounting plate 14. The cover 22 remains connected to the mounting plate 14 in the second channel 32 of the cover 22 and swings out of the way of expanding flotation bladder 28.

The preferred embodiment of the cover-removing tubing 24 and the flotation bladders 28 are single bladders that are each a given length and are attached to the mounting plate 14 individually. It should be noted that the flotation bladders 28 can be constructed from more than a single bladder with each portion inflating individually.

Either type of the cover-removing tubing 24 and the flotation bladder 28 can be used with any of the embodiments of the flotation device 10. The plurality of the flotation bladders 28 are the preferred embodiment because they are easier to manufacture and makes the flotation device 10 easier to mount on a variety of aircrafts 12. The cover-removing tubings 24 and the flotation bladders 28 are manufactured in a given length and the needed numbers of tubings and bladders 24, 28 are positioned along the length of the fuselage 16 of the aircraft 12.

A manual switch (not shown) is the preferred activation method, with a safety on the switch to prevent accidental deployment. A safety interlock with airspeed indicators, engine speed, or altitude could be included. Optional automatic activation systems can include mechanical, manual pumping, chemical, electronic, or other external sensor or signal driven switches. One embodiment is a float switch activation assembly (not shown) which activates the flotation device 10 of the present invention. The float switch activation assembly is described in U.S. Pat. No. 6,435,125, issued on Aug. 20, 2002, entitled "Float Switch Activation Assembly", assigned to the same assignee of the present invention and which are hereby herein incorporated by reference.

The float switch activation assembly, or other activation method, is mounted on the inside of the fuselage 16 of the aircraft 12 and is fluidly connected to the gas supply. Extending from the float switch or other activation assembly is the gas supply line 58 connected to the cover-removing tubings 24 and the flotation bladders 28. Upon activation of the float switch activation assembly, gas flows from the gas supply through the gas supply line 58 to the cover-removing tubings 24 and the flotation bladders 28 thereby inflating the cover-removing tubings 24 and the flotation bladders 28 and removing the cover 22. It should be noted that redundant gas supplies, redundant activation systems, and redundant switches, valves, and gas lines are within the scope of the present invention for supplying gas to the flotation device 10 in case of a compromise of the integrity of the flotation device 10 or of any part of the flotation system.

The activation of the flotation device 10 of the present invention can be accomplished by an electrical bladder deployment system (not shown) with self test. The electrical bladder deployment system is described in pending patent application Ser. No. 10/223,665, filed Aug. 19, 2002, entitled "Inflating Watercraft Flotation Device", assigned to the same assignee of the present invention and is hereby herein incorporated by reference.

The flotation device 10 of the present invention, when activated, increases the beam of the aircraft 12 in the water increasing the stability of the aircraft 12 to inhibit the aircraft 12 from tipping over during rough water conditions. Additional stability could be created by the addition of bags at or near the tip of the wings, and at any additional location on the aircraft 12. The flotation device 10 of the present invention can also provide an emergency notification signal or other type of signal based on the water level in the fuselage of the aircraft 12.

A safety interlock (not shown) can be added to the flotation device 10 to inhibit inappropriate deployment of the flotation bladders 28 such as when aircraft 12 is at a certain altitude, when engine is running at certain rate, when aircraft 12 is traveling at or above certain speeds, and/or when accidentally activated manually.

The flotation bladders 28 can be brightly colored and/or marked with easy to see patterns or emergency messages for easier discovery by search and rescue. Also, the flotation bladders 28 can be fabricated of or coated with a material more easily detected by radar. In addition, all parts of the flotation device 10 should be constructed from a material, such as composite materials, which can withstand wide temperature ranges and different water types such as fresh and salt. Furthermore, flotation bladder deployment can trigger emergency location beacon(s) or other wireless distress messages.

Though the primary purpose of the flotation device 10 of the present invention is for buoyancy after a water landing, a secondary use could be as an emergency protection for the aircraft 12 and the passengers in other emergency situations such as broken or malfunctioning landing gear, crash landings, rough runways, short runways, etc. In such case, the flotation bladders 28 would serve as cushion and protection and would be deployed manually or automatically by sensors or trigger valves. The positioning and attachment of the flotation device 10 for this secondary use would be to mount the flotation bladders 28 above the normal landing gear and away from the wing flaps and other operating parts of the aircraft 12. Additional flotation devices 10 could be positioned at various places on, over, in, and around the aircraft 12, not just at the best places for flotation, for additional protection of the aircraft 12 and passengers, as desired. The crash version of the flotation bladders 28 would have a gas release valve set to pen after inflation yet prior to impact to absorb at least some of the impact by controlled release of some or most of the gas during impact. Or, the gas can be released through the design of the flotation bladders 28 which allow release through mesh, openings, or releasable panels, or large relief valves. The flotation bladders 28 for crash purposes could be set to deploy only after the speed of the aircraft 12 was slow enough or the aircraft 12 was close enough to the ground so that the flotation bladders 28 would not be destroyed by airspeed, or would not hinder flight. Of course, there could be a plurality of flotation devices 10 with some being for flotation and others being for cushioning.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A flotation device for maintaining an aircraft in a floating and stable condition, the aircraft having an outer surface, the flotation device comprising:
   at least one flotation bladder mounted to the outer surface of the aircraft; and
   inflation means for inflating the flotation bladder;
   monitoring means for determining the occurrence of a predetermined event;
   wherein the inflation of the flotation bladder occurs upon the predetermined event; and
   wherein the flotation bladders can be used during emergency landings on land or water.

2. The flotation device of claim 1 wherein the inflation of the flotation bladder is selected from the group consisting of automatic and manual.

3. The flotation device of claim 1 wherein the predetermined event is a predetermined amount of water entering the aircraft.

4. The flotation device of claim 1, and further comprising:
a float switch activating a valve upon a predetermined amount of water entering the aircraft, the valve connected to the inflation means for activating the inflation means.

5. The flotation device of claim 1 wherein the flotation bladder is in a substantially flattened spiral configuration prior to inflation.

6. The flotation device of claim 1 wherein the flotation bladder comprises a plurality of flotation bladders, each flotation bladder being independently inflatable.

7. The flotation device of claim 1 wherein at least one of the flotation bladders has coloring and markings.

8. The flotation device of claim 1 wherein the activation of the flotation bladder triggers an emergency beacon.

9. An emergency buoyant support for an aircraft in the water, the emergency buoyant support comprising:
a cover releasably secured to the aircraft;
at least one inflatable flotation bladder positioned between the cover and the aircraft;
wherein upon inflation of the flotation bladder, the flotation bladder moves the cover in a general direction away from the aircraft.

10. The emergency buoyant support of claim 9, and further comprising:
a carrier mounted to the aircraft.

11. The emergency buoyant support of claim 9, and further comprising:
inflation means for inflating the flotation bladder; and
a gas supply tubing connected to the inflation means, the flotation bladder being secured to the gas supply tubing such that gas flowing through the gas supply tubing inflates the flotation bladder.

12. The emergency buoyant support of claim 11, and further comprising:
a float switch activating a valve upon a predetermined amount of water entering the aircraft, the valve connected to the inflation means for activating the inflation means; and
a gas supply connected to the gas supply tubing and the float switch.

13. A method for maintaining an aircraft in the water in a stable floating condition, the aircraft having an outer surface, the method comprising:
mounting at least one flotation bladder to the outer surface of the aircraft;
inflating the flotation bladder upon occurrence of a predetermined event activating an emergency beacon upon inflation of the flotation bladder; and
using the flotation bladders during emergency landings on land or water.

14. The method of claim 13 and further comprising:
inflating the flotation bladder automatically or manually.

15. The method of claim 13 and further comprising:
monitoring the occurrence of the predetermined event.

16. The method of claim 13 and further comprising:
activating a valve upon a predetermined amount of water entering the aircraft, the valve connected to the inflation means for activating the inflation means.

17. The method of claim 13 and further comprising:
folding the flotation bladder is in a substantially flattened spiral configuration prior to inflation.

18. The method of claim 13 and further comprising:
providing a plurality of flotation bladders, each flotation bladder being independently inflatable.

19. The method of claim 13 and further comprising:
coloring and marking the flotation bladder.

20. A flotation device for maintaining an aircraft in a floating and stable condition, the flotation device comprising:
at least one flotation bladder mounted to the aircraft;
inflation means for inflating the flotation bladder; and
monitoring means for determining the occurrence of the predetermined event.

21. The flotation device of claim 20 wherein the predetermined event is a predetermined amount of water entering the aircraft.

22. A flotation device for maintaining an aircraft in a floating and stable condition, the flotation device comprising:
at least one flotation bladder mounted to the aircraft;
inflation means for inflating the flotation bladder; and
a float switch activating a valve upon a predetermined amount of water entering the aircraft, the valve connected to the inflation means for activating the inflation means.

23. A flotation device for maintaining an aircraft in a floating and stable condition, the flotation device comprising:
at least one flotation bladder mounted to the aircraft; and
inflation means for inflating the flotation bladder;
wherein the flotation bladder is in a substantially flattened spiral configuration prior to inflation.

24. A flotation device for maintaining an aircraft in a floating and stable condition, the flotation device comprising:
at least one flotation bladder mounted to the aircraft; and
inflation means for inflating the flotation bladder;
wherein the activation of the flotation bladder triggers an emergency beacon.

25. A method for maintaining an aircraft in the water in a stable floating condition, the method comprising:
mounting at least one flotation bladder to the aircraft;
inflating the flotation bladder upon occurrence of a predetermined event; and
monitoring the occurrence of the predetermined event.

26. A method for maintaining an aircraft in the water in a stable floating condition, the method comprising:
mounting at least one flotation bladder to the aircraft;
inflating the flotation bladder upon occurrence of a predetermined event; and
activating a valve upon a predetermined amount of water entering the aircraft, the valve connected to the inflation means for activating the inflation means.

* * * * *